(12) United States Patent
Yocam

(10) Patent No.: US 12,067,638 B2
(45) Date of Patent: Aug. 20, 2024

(54) IDENTITY MANAGEMENT

(71) Applicant: T-Mobile USA, Inc., Bellevue, WA (US)

(72) Inventor: Eric Yocam, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 522 days.

(21) Appl. No.: 17/088,512

(22) Filed: Nov. 3, 2020

(65) Prior Publication Data

US 2022/0138882 A1 May 5, 2022

(51) Int. Cl.
G06Q 10/10 (2023.01)
G06Q 40/08 (2012.01)
G06Q 50/26 (2012.01)
H04L 67/52 (2022.01)

(52) U.S. Cl.
CPC ........... G06Q 50/265 (2013.01); H04L 67/52 (2022.05)

(58) Field of Classification Search
CPC ....... G06Q 50/265; H04L 67/52; H04L 67/10; H04L 67/12
USPC ................................... 705/1.1, 325
See application file for complete search history.

(56) References Cited

U.S. PATENT DOCUMENTS

| | | | |
|---|---|---|---|
| 10,108,794 B2 | 10/2018 | Bouse | |
| 10,579,783 B1* | 3/2020 | Aument | G06V 40/40 |
| 11,157,907 B1* | 10/2021 | Kumar | G06Q 20/308 |
| 11,204,991 B1* | 12/2021 | Giraud | G06F 21/45 |
| 11,290,448 B1* | 3/2022 | Bordow | G06F 21/316 |
| 2008/0207220 A1* | 8/2008 | Aaron | H04W 12/126 455/456.1 |
| 2008/0209543 A1* | 8/2008 | Aaron | G06F 21/31 726/17 |
| 2014/0089673 A1 | 3/2014 | Luna | |
| 2016/0307031 A1 | 10/2016 | Zhong et al. | |
| 2019/0080538 A1* | 3/2019 | Shahidi | H04L 9/3255 |
| 2019/0097812 A1 | 3/2019 | Toth | |
| 2019/0114643 A1* | 4/2019 | Dewitt | G06Q 20/40145 |
| 2020/0202028 A1 | 6/2020 | Tadayon et al. | |
| 2021/0056554 A1* | 2/2021 | Muthu | G06Q 50/01 |
| 2021/0073933 A1* | 3/2021 | Punnoose | H04W 12/06 |

FOREIGN PATENT DOCUMENTS

WO   WO-2021226471 A1 * 11/2021

* cited by examiner

*Primary Examiner* — Jonathan P Ouellette
(74) *Attorney, Agent, or Firm* — Conley Rose, P.C.; Michael W. Piper; Elexis A. Jones

(57) ABSTRACT

Methods, systems, and apparatus, including computer programs encoded on a computer storage medium, for identifying management, are disclosed. In one aspect, a method includes the actions of receiving, at a given time, a request to verify an identity of a user and a location of the user. The actions further include, in response to the request to verify the identity of the user, identifying a computing device associated with the user. The actions further include determining a previous time and a previous location that computing device verified the identity of the user. The actions further include, based on the given time, the location of the user, the previous time, and the previous location, determining whether to output data verifying the identity of the user at the location.

16 Claims, 6 Drawing Sheets

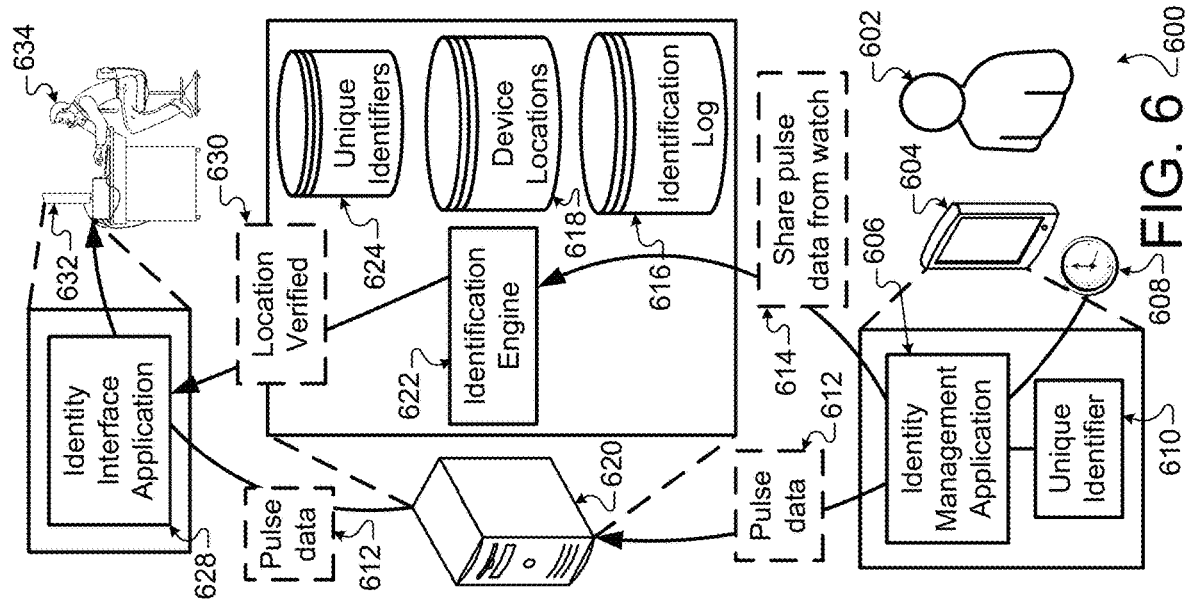

IDENTITY MANAGEMENT

BACKGROUND

For a user to prove the identity of the user, the user may carry and present a physical identification card, such as a driver's license. This identification card may be issued by a government entity and may include identifying information such as the user's name, a picture of the user, and the user's birthdate.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIGS. 3-5 illustrate example scenarios of an example system confirming a user's identity.

FIGS. 6-8 illustrate example scenarios of a user managing the user's identity.

DETAILED DESCRIPTION

Mobile devices include numerous sensors that collect data related to many aspects of the environment. These sensors can include an accelerometer, a gyroscope, a proximity sensor, a heart rate sensor, and a thermometer in addition to sensors such as a camera, a microphone, and a fingerprint sensor. In some instances, the data collected by each of these sensors is precise enough that an individual can be identified by the data. Just as an individual can be identified using a fingerprint, an individual can be identified by data collected from the accelerometer. This data may correspond to the individual's unique gait. With the ability of a mobile device to positively identify an individual, it is important to give the individual control over this ability and prevent unauthorized access to the identity.

When a user signs up for a wireless service with a wireless carrier, the carrier may initialize the user's identity and generate an identifier. The carrier may store this identifier on the mobile device and at a server. The user may perform some actions that allow the mobile device to collect sensor data that may help to identify the user. These actions may include walking around with the mobile device to allow the accelerometer to collect data to assist in identifying the user's gait. Other actions may include providing voice samples, heart rate data, and/or images of the user's face. The device may use these samples to train various models that the mobile device may use to later verify the user's identity.

As the user interacts the mobile device, the mobile device may periodically verify the user's identity. The mobile device may use the model to analyze the accelerometer data to confirm that the movement corresponds to the user's gait. Based on this confirmation, the mobile device may update the identifier stored on the phone indicating the time, date, and location of the confirmation. The mobile device may provide the same information to the server, and the server may update the identifier stored on the server. This way, the mobile device and the server have an identifier that is continuously updated and includes the date, time, and location where the user's identity was last verified.

When another entity requests that the user prove the user's identity, the entity may submit a request to the server. The request may include the location of the entity. The server may request permission from the user through the mobile device. If granted, then the server may check the identity stored on the server and determine the previous date, time, and location where the user's identity was last verified. If the verification location is within a threshold distance of the location of the entity's location, and the verification time is within a threshold period of time of the previous time, then the server may verify user's identity to the entity.

Figure 1:
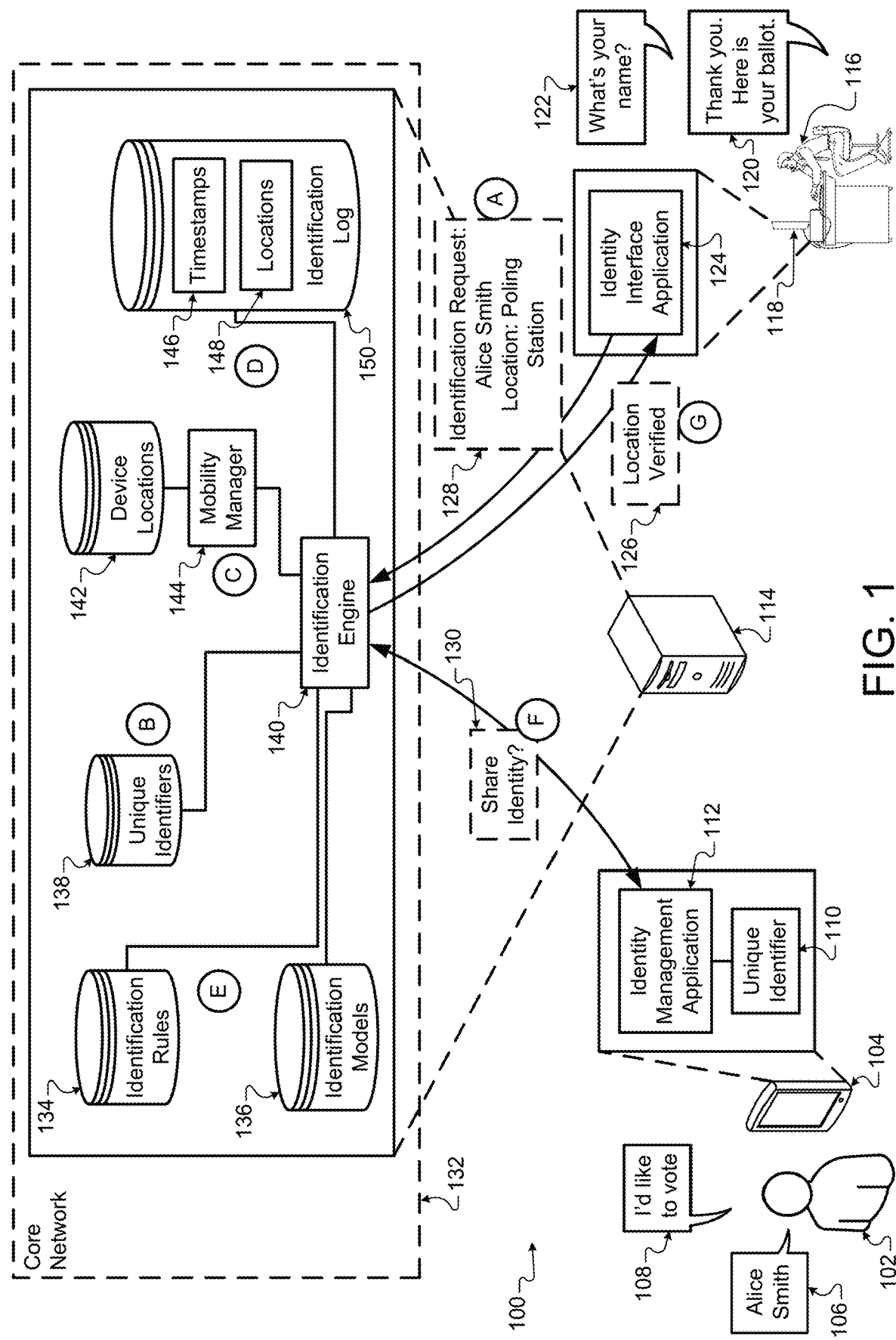
FIG. 1 illustrates an example system that allows a user to manage the user's identity.

FIG. 1 illustrates an example system 100 that allows a user 102 to manage the user's identity. Briefly, and as described in more detail below, the system 100 includes a server 114 that is configured to interface with the computing device 104 of the user 102 and the computing device 118 of the user 116. The user 116 is able to request, through the computing device 118, that the server 114 confirm the identity of the user 102. The user 102, through computing device 104, may be able to authorize the server 114 to share the identity of the user 102 with the user 116.

In more detail, the user 102 may be attempting to vote at a polling station. The user 116 may be working at the polling station and may be responsible for confirming the identity of the voters. The user 116 may use the computing device 118 to confirm the identity of the user 102. The computing device 118 may interface with the server 114. The server 114 may be able to determine the location of the computing device 104 and the previous locations where the server 114 confirmed the identity of the user 102. Based on the location of the computing device 104 and the previous locations where the server 114 confirmed the identity of the user 102, the server 114 may determine that the user 102 is at the polling station. The server 114 may transmit a confirmation to the computing device 118 that confirms the identity of the user 102. The user 116 may view the confirmation on the computing device 118 and allow the user 102 to proceed with voting.

In stage A, the user 102 enters the polling station with the computing device 104. The user 116 may be working at the polling station and checking the identifications of voters who enter the polling station. The user 102 may approach the user 116 and indicate the desire to vote by stating utterance 108, "I'd like to vote." In some instances, the user 102 may provide a physical government issued identification card to the user 116 to prove the identity of the user 102. In this case, the user 116 may request the name of the user 102 by stating utterance 122, "What's your name?" The user 102 may respond with the utterance 106, "Alice Smith." The user 116 may enter the name of the user 102 into the computing device or select the name of the user 102 from a roll of registered voters for that polling station. The user 116 may request that the identity of the user 102 be confirmed.

The user 116 may be interacting with an identity interface application 124 that is running on the computing device 118. The identity interface application 124 may be configured to receive the name of a user and output data indicting whether that user is near the computing device 118. The identity interface application 124 may interact with the server 114 to confirm the identity of a user. The identity interface application 124 may be configured to transmit an identification request 128 that requests that the server 114 confirm the identity of the user identified in the request. The identification request 128 may include the location of the computing device 118 and the name of the person whose identity the user 116 is requesting to confirm. As illustrated in the example of FIG. 1, the identification request 128 indicates the name of the user 102, Alice Smith, and the location of the polling station.

The server 114 includes an identification engine 140 that receives the identification request 128. The identification engine 140 may be configured to interact with the identity interface application 124 of the computing device 118. The identification engine 140 may use various factors to determine whether the user 102 is likely at the location specified in the identification request 128. The identification engine 140 may analyze the previous times and/or locations where the identification engine 140 confirmed the identity of the user 102. The identification engine 140 may compare the previous times and/or locations, the current location of the computing device 104, and the location specified in the identification request 128 to determine whether the person specified in the identification request 128 is likely at the location specified in the identification request 128. If the identification engine 140 determines that the user 102 is likely at the location specified in the identification request 128, then the identification engine 140 may transmit data indicating that determination to the identity interface application 124. If the identification engine 140 determines that the user 102 is likely not at the location specified in the identification request 128, then the identification engine 140 may transmit, to the identity interface application 124, data indicating that the user 102 is likely not at the location specified in the identification request 128.

In stage B, the identification engine 140 accesses the unique identifiers storage 138. The unique identifiers storage 138 includes a unique identifier and corresponding identifying information for each of the users who are enrolled in the identification system that the identification engine 140 manages. Each identifier may correspond to a different user and may be assigned when the user is enrolled in the identification system. For example, the user 102 may be enrolled in the identification system when the user 102 purchases the computing device 104 at a retail store and presents an identification document, such as a driver's license. An employee of the retail store may enroll the user 102 in the identification system by examining the identification document and associating the computing device 104 with the user 102. The identification engine 140 may generate an identifier for the user 102 and store the identifier in the unique identifiers storage 138. The identification engine 140 may also provide the identifier 110 to the computing device 104 for storing locally in the computing device 104.

In some implementations, the identification engine 140 may identify more than one identifier in the unique identifiers storage 138 that corresponds to the user named in the identification request 128. This may occur when there is more than one person with the same name. The identification engine 140 may compare the number of identifiers to a threshold. If the number of identifiers is less than a threshold, then the identification engine 140 may proceed with attempting to confirm the identity of each person who corresponds to the matching identifiers. If the number of identifiers is less than a threshold, then processing capacity of the identification engine 140 may be able to process the identifiers to determine which one corresponds to the user 102. If the number of identifiers is greater than the threshold, then the identification engine 140 may request additional information because the number of identifiers may be too high for the processing capacity of the identification engine 140 to process all the identifiers to determine which one corresponds to the user 102. In this case, the identification engine 140 may transmit a request to the computing device 118 requesting additional identifying information about the user 102. The user 116 may provide a birthdate, address, and/or any other similar information that the identification engine 140 may use to identify a corresponding identifier in the unique identifiers storage 138. Each identifier in the unique identifiers storage 138 may correspond to a name, birthdate, address, and/or any other similar information.

In stage C, the identification engine 140 determines the location of the computing device that corresponds to the identifier from the unique identifiers 138. The server 114 includes a mobility manager 144 that is configured to monitor the location of the various devices that are communicating with the server 114. The mobility manager 144 may store the location data of the various devices in the device locations storage 142. The mobility manager 144 may determine the location of the various devices based on the base station with which each device is connected. In some instances, the mobility manager 144 may use triangulation, using base stations that are able to communicate with each device to determine the location of each device. In some instances, each device may transmit, to the server 114, location data that may include GPS data that reflects a location of the device.

The server 114 may be included in a wireless carrier network that provides voice and data communication services to multiple subscriber devices, such as the computing device 104, the computing device 118, and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards.

The wireless carrier network may include a radio access network and a core network 132. The radio access network may include multiple base stations. The multiple base stations are responsible for handling voice and data traffic between multiple subscriber devices, such as the computing device 104, the computing device 118, and other devices and the core network 132. Accordingly, each of the base stations may provide a corresponding network cell that delivers telecommunication and data communication coverage. The core network 132 may use the network cells to provide communication services to the multiple subscriber devices. For example, the core network 132 may connect the multiple subscriber devices to other telecommunication and data communication networks, such as the Internet and the public switched telephone network (PSTN). The base stations are responsible for handling voice and data traffic between devices and the core network 132. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send RF signals to devices and receive radio signals from devices.

In some implementations, the communications between the computing device 104 and the server 114 may be through a wired network connection, a wireless network connection, such as Wi-Fi, short-range radio, an infrared connection, and/or any other similar connection. In some implementations, the communications between the computing device 118 and the server 114 may be through a wired network connection, a wireless network connection, such as Wi-Fi, short-range radio, an infrared connection, and/or any other similar connection.

The identification engine 140 may provide the identifier from the unique identifiers storage 138 to the mobility manager 144 and a request to provide the location of the computing device that corresponds to that identifier. The mobility manager 144 may access the device locations storage 142 and determine the location of the computing device 104. The mobility manager 144 may provide the location of the computing device 104 to the identification engine 140. In some implementations, mobility manager 144 may access data that relates each of the unique identifiers to a device identifier. In this case, the unique identifier may be tied to a person such that if the user purchases a new device, then the unique identifier for that user will then be tied to a different device identifier.

The server 114 includes an identification log 150. The identification log 150 includes data that indicates the locations 148 and timestamps 146 where and when the identity of the user 102 and other users were confirmed. In some implementations, the identification engine 140 may receive data from the computing device 104 indicating that the computing device 104 confirmed the identity of the user 102. For example, the computing device 104 may monitor the movement of the computing device 104. When the computing device 104 determines that the movement of the computing device 104 corresponds to the gait of the user 102, the identity management application 112 provides the unique identifier 110 and data indicating that the computing device 104 confirmed the identity of the user 102. The identification engine 140 may request the location of the computing device 104 from the mobility manager 144. The identification engine 140 may store the current time in the timestamps 146 and the location of the computing device 104 in the locations 148 and data indicating that the time and location corresponds to the unique identifier 110.

In some implementations, the identification engine 140 may confirm the identity of the user 102 and store the time of confirmation and the location of the computing device 104 in the timestamps 146 and the locations 148. For example, the identification engine 140 may monitor the location of the computing device 104 by communicating with the mobility manager 144. The identification engine 140 may determine that, based on the locations where the computing device 104 has been, that the computing device 104 has been with the user 102. The identification engine 140 may access data that relates the computing device 104 to the unique identifier 110 and/or may request the unique identifier 110 from the computing device 104. The identification engine 140 may store the current time in the timestamps 146 and the current location of the computing device 104 in the locations 148 and data indicating that the time and location corresponds to the unique identifier 110.

In stage D, the identification engine 140 provides the identifier from the unique identifiers storage 138 to the identification log 150 and a request to provide one or more previous locations and times where and when the identification engine 140 confirmed the identity of the user 102. The locations and times may correspond to, for example, the last time and location where and when the identification engine 140 confirmed the identity of the user 102 or the last three times and locations where and when the identification engine 140 confirmed the identity of the user 102. The identification engine 140 may request the previous locations and times that may correspond to the last one or more locations. For example, the identification engine 140 may request the previous locations and times that correspond to the last three different locations. This may include more than three locations and times if the identification engine 140 confirmed the identity of the user 102 multiple times in the same locations. The identification engine 140 may request the previous locations and times that may correspond to a previous time period. For example, the identification engine 140 may request the previous locations and times that correspond to the last forty-eight hours.

In stage E, the identification engine 140 applies the identification rules 134 and/or the identification models 136 to the previous locations and times received from the identification log 150 and the current location indicated in the request 128. The identification engine 140 determines whether the user 102 is located at the current location indicated in the request 128. The identification rules 134 may include rules that specify how to compare the previous locations and times with the current location. For example, an identification rule may specify to verify that the user 102 is at the location indicated in the request 128 if the identification engine 140 previously confirmed the identity of the user 102 within ten miles of the current location and less than one hour ago. In this case, if the identification engine 140 previously confirmed the identity of the user 102 thirty minutes ago and eight miles from the polling station, then the identification engine 140 will verify that the user 102 is at the polling station. The identification engine 140 may also make this determination based on the computing device 104 being located at the polling station.

The identification rules 134 may include other rules that specify how to compare the previous locations and times received from the identification log 150 and the current location. For example, a rule may specify to verify that the user 102 is at the current location if the current location is along a path indicated by the previous locations from the identification log 150. As another example, a rule may specify to verify that the user 102 is at the current location if the current location is within a threshold distance of the most immediate previous location and the timestamp of the most immediate previous location is within a threshold period of time of the current time. In some implementations, the threshold period of time and the threshold distance may be related by a ratio, such that the threshold period of time may be longer if the threshold distance is shorter and the threshold period of time may be shorter if the threshold distance is longer.

The identification models 136 may be configured to receive data identifying the current location and the previous locations and times received from the identification log 150. The identification models 136 may be configured to output data indicating whether the user 102 is likely at the current location. In some implementations, the identification models 136 may output a confidence score that indicates a likelihood that the user 102 is at the current location. For example, a confidence score of 0.3 may indicate a thirty percent likelihood that the user 102 is at the current location. A confidence score of 0.8 may indicate an eighty percent likelihood that the user 102 is at the current location. The identification models 136 may include various models that are each configured to receive a different number of previous locations and times. For example, an identification model may be configured to receive the current location and one previous location and time pair. Another identification model may be configured to receive the current location and four previous location and time pairs. The identification engine 140 may be configured to select the identification model based on the number of location and time pairs received from the identification log 150.

The identification models 136 may be trained using machine learning and historical data that indicates, for various users, previous locations and times that each of the users were at the previous locations. Each model may be trained to using training data that includes previous locations and times. The training data may be grouped into data samples that each include the same number of consecutively collected locations and times. The latest time and corresponding location may be designated as the current location such that each data sample has the same number of consecutively collected locations and times and a location designated as the current location. The server 114 may train an identification model to receive the same number of consecutively collected locations and times and a current location and output data indicating whether the user is at the current location. The server 114 may train different models that are each configured to receive a different number of consecutively collected locations and times based on the size of the data samples used to train the models.

In some implementations, the identification engine 140 may use a combination of the identification models 136 and the identification rules 134 to determine whether the user 102 is likely at the current location. The identification engine 140 identify an identification model from the identification models 136 based on the number of previous location and time pairs received from the identification log 150. The identification engine 140 may provide the current location and the previous location and time pairs to the selected identification model. The selected identification model may output a confidence score that indicates a likelihood that the user 102 is at the current location. If the confidence score is less than a lower threshold, then the identification engine 140 may determine that the user 102 is likely not at the current location. If the confidence score is greater than an upper threshold, then the identification engine 140 may determine that the user 102 is likely at the current location. If the confidence score is between the lower and upper thresholds, then identification engine 140 may apply the identification rules 134 to the current location and the previous location and time pairs to determine whether user 102 is likely at the current location.

In some implementations and in stage F, the identification engine 140 requests permission from the user 102 whether to transmit verification data 126 indicating that the user 102 is at the current location. The identification engine 140 may determine that the user 102 is likely at the current location. The identification engine 140 may transmit a share request 130 to the identity management application 112 of the computing device 104. The share request 130 may include the unique identifier received from the unique identifiers storage 138 and a request for permission to confirm whether the user 102 is located at the current location. The identity management application 112 may generate a graphical interface that allows the user 102 to allow or deny the request for permission to confirm whether the user 102 is located at the current location. If the user 102 selects the option to deny the request, then the identification engine 140 may provide data to the identity interface application 124 of the computing device 118 indicating that the server 114 is unable to determine whether the user 102 is at the current location. If the user 102 selects the option to allow the request, then the identification engine 140 may proceed as indicated in stage G.

In stage G, the identification engine 140 may provide, to the identity interface application 124 of the computing device 118, verification data 126 indicating that the user 102 is at the current location. The verification data 126 may confirm that the user identified in the request 128 is at the current location. The identity interface application 124 may generate a graphical interface indicating that the user identified in the request 128 is at the current location. In the example of FIG. 1, the request 128 may indicate that the user 102 is located at the current location. The identity interface application 124 may generate a graphical interface indicating that the user 102 is at the polling station. The user 116 may view the graphical interface on the computing device 118 and take action. For example, the user 116 may say utterance 120, "Thank you. Here is your ballot," and provide the user 102 with a ballot to vote.

In some implementations, the user 102 may attempt to vote without traveling to the polling station. In this case, the user 102 may access a voting server that is configured to receive the vote of the user 102. The user 102 may access the voting server using the computing device 104 or another computing device. The user 102 may provide identifying information to the voting server. The voting server may include the identity interface application 124. The identity interface application 124 may provide the identifying information to the server 114 in a similar manner to stage A. The identification engine 140 may perform similar actions as illustrated in stages B, C, D, and E. The identification engine 140 may determine that the location of the user 102 and the computing device 104 are likely in the same location of the computing device that the user 102 is using to access the voting server. The computing device that the user 102 is using to access the voting server may be the same as the computing device 104. Similar to stage F, the user 102 may grant the server 114 permission to verify the location of the user 102 with the identity interface application 124. Similar to stage G, the server 114 may provide the identity interface application 124 with data verifying the location of the user 102. The identity interface application 124 may provide the data indicating the location of the user 102 to the voting application. The voting application may compare the location of the user 102 to the location of the computing device that the user 102 is using to access the voting server. If the two locations match, then the voting server may allow the user 102 to cast a vote without the need of the user 102 to travel to the polling station.

The functionalities of any of the computing device 104, the server 114, and the computing device 118 may be performed by any of the computing device 104, the server 114, and the computing device 118. In some implementations, the functionalities may be part of an operating system that is running on any of the computing device 104, the server 114, and the computing device 118. In some implementations, some of the functionalities may be performed by additional computing devices. For example, the mobility manager 144 of the server 114 may be implemented by another computing device that is in communication with the server 114.

Figure 2:
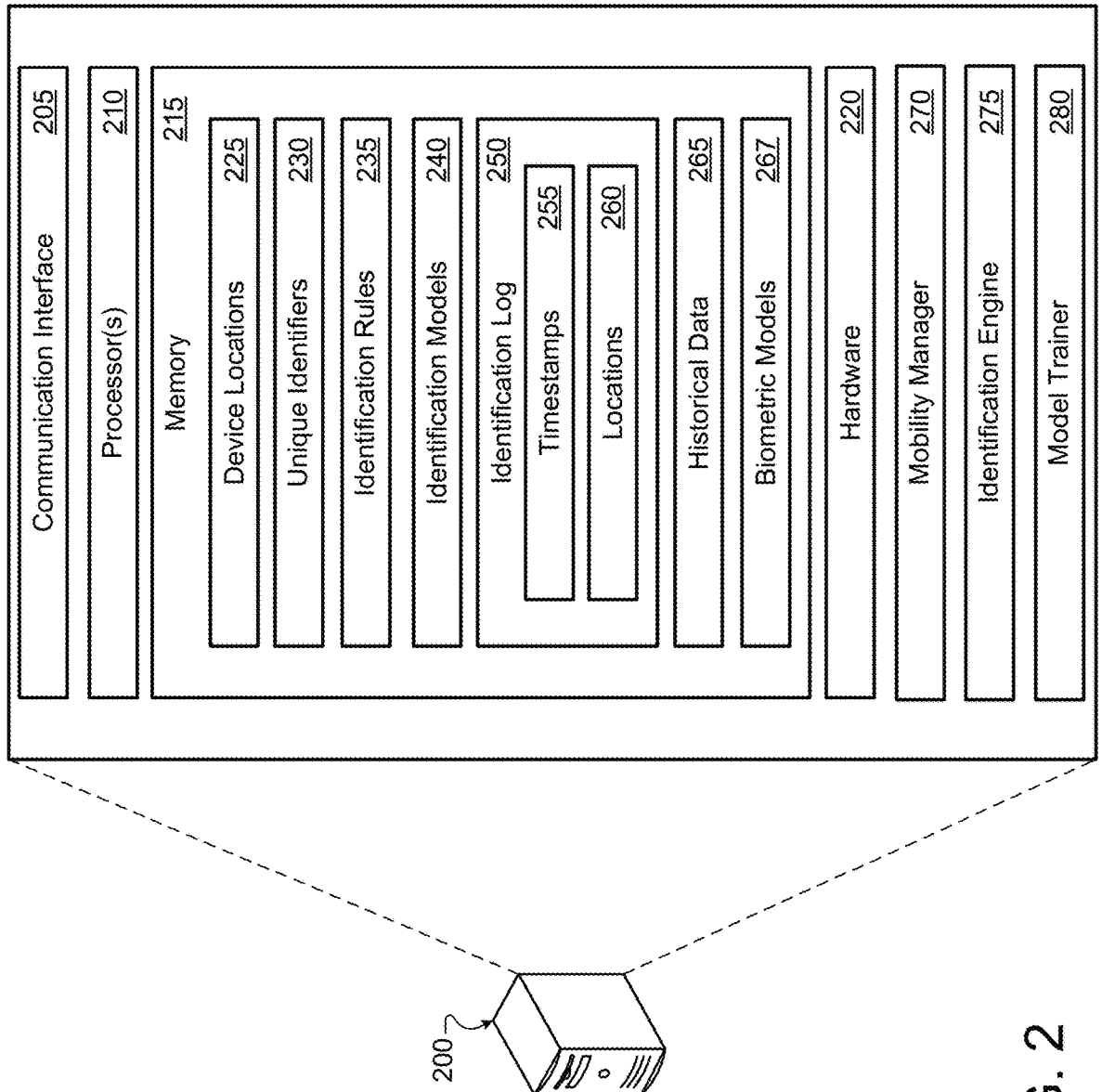
FIG. 2 illustrates an example server that allows a user to manage the user's identity.

FIG. 2 illustrates an example server 200 that allows a user to manage the user's identity. The server 200 may be any type of computing device that is configured to be integrated into a wireless carrier network or interact with a wireless carrier network. The server 200 may be any type of computing device that is configured to communicate with other computing devices through a local area network, wide area network, wired network, wireless network, such as Wi-Fi, short-range radio, infrared, and/or any other similar type of communication channels. For example, the server 200 may be similar to the server 114 of FIG. 1. Some of the components of the server 200 may be implemented in a single computing device or distributed over multiple computing devices. Some of the components may be in the form of virtual machines or software containers that are hosted in a cloud in communication with, e.g., disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. The communication interface 205 may be configured to transmit and receive data from devices connected to a local area network, wide area network, wired network, wireless network, and/or any other similar type of network.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a mobility manager 270. The mobility manager 270 may be similar to the mobility manager 144 of FIG. 1. The mobility manager 270 may be configured to monitor the location of a computing device that is connected to the server 200 through a wireless base station such as a gNodeB. The location of the computing device may include the wireless base station to which the computing device is connected and/or GPS data received from the subscriber device. The mobility manager 270 may store the location data in the device locations 225 that is implemented by the memory 315.

In some implementations, the mobility manager 270 may determine the location of a computing device at periodic intervals, such as every five seconds. In some implementations, the mobility manager 270 may determine the location of a computing device when the computing devices connects to a different wireless base station and/or provides updated GPS data. In some implementations, the mobility manager 270 may determine the location of the computing device relative to the base station with which the computing device is communicating. In this case, the mobility manager 270 may determine the relative location based on data collected from the base station such as signal strength and direction of communications between the computing device and the base station. The mobility manager 270 may also determine the relative location based on the location of the base station and GPS data received from the computing device. The relative location data may include a distance between the computing device and the base station, the cardinal direction from the base station to the subscriber device, and/or any other similar measurements.

The one or more processors 210 may implement an identification engine 275. The identification engine 275 may be similar to the identification engine 140 of FIG. 1. The identification engine 275 may be configured to multiple functions related to the management of the identity of various users. A first function may include the recording of the location and corresponding times where the identity of a user is confirmed. A second function may include the responding to identity requests from identity interface applications that are running on separate computing devices. The identity requests may include a location and identifying information for a user and a request to confirm whether the user is at the location.

The wireless carrier may assign a self-sovereign identity to a user when the user purchases a computing device to use on the wireless carrier network. In some instances, the self-sovereign identity may be preassigned by a government entity, and the wireless carrier may use the same self-sovereign identity for the user. The wireless carrier may store the self-sovereign identity in the unique identifiers 230. Each self-sovereign identity may be a unique identifier that is associated with one or more computing devices that the corresponding user uses on the wireless carrier network. If the user replaces a computing device, then the wireless carrier may update the computing devices that are associated with the self-sovereign identity. If the user chooses to use another wireless carrier, then the user may use the same self-sovereign identity for the new wireless carrier.

To perform the function of recording of the location and corresponding times where the identity of a user is confirmed, the identification engine 275 may use biometrics to determine when a user is interacting with the computing device of the user. The biometric models 267 may be stored on the computing device or on the server 200 in the memory 215. The biometric models may be configured to receive various sensor data and/or location data from the computing device and determine whether the computing device is being used by the user of the computing device. In some implementations, the biometric models 267 may be continuously active and analyzing the sensor data. In some implementations, the biometric models 267 may be active if a sensor generates new data such as a motion sensor indicating that the computing device is moving or if the computing device indicates that a user is interacting with the computing device.

Each of the biometric models may be configured to identify a particular user. For example, a biometric model may be configured to determine when the motion of the computing device matches the gait of a particular user. Another biometric model may be configured to determine when a particular user is typing on the computing device because the typing patterns of different users may be different. Each biometric model may be associated to a unique identifier of a self-sovereign identity. Each time a biometric model determines that a particular user is near or interacting with the computing device, the biometric model may output data indicating the user who corresponds to the unique identifier of the self-sovereign identity is interacting with the computing device.

The identification engine 275 may receive, from a biometric model, data confirming that a user is interacting with the computing device. The data may include the unique identifier of the self-sovereign identity and/or the data identifying the computing device. If the data does not include the unique identifier of the self-sovereign identity, then the identification engine 275 may access the unique identifiers 230 to determine the unique identifier of the self-sovereign identity that corresponds to the identified computing device. The identification engine 275 may request the current location of the computing device from the mobility manager 270. The mobility manager 270 may access the device locations 225 for the current location of the computing device. The identification engine 275 may store, in the locations 260 of the identification log 250, the unique identifier of the self-sovereign identity and the location of the computing device. The identification engine 275 may store, in the timestamps of the identification log 250, the date and time that the biometric model determined the user was interacting with the computing device.

The identification log 250 may include locations 260 and timestamps 255 where and when the identify of multiple users were confirmed as well as multiple locations 260 and timestamps 255 for each user. In some implementations, the identification log 250 may include locations 260 and timestamps 255 for a previous period of time, such as two weeks. In some implementations, the identification log 250 may include locations 260 and timestamps 255 for a previous number of confirmations from the biometric models, such as the previous ten confirmations.

To perform the function of responding to identity requests from identity interface applications that are running on separate computing devices, the identification engine 275 may analyze the locations 260 and timestamps 255 of the identification log 250 using the identification rules 235 and/or the identification models 240. An identity request may include identifying information for the user and a current location. The identification engine 275 may analyze one or more previous locations and times where the user was located and the current location. The identification engine 275 may respond to the identity request with data indicating that the user is likely located at the location or that the identification engine 275 was unable to determine whether the user is likely at the location.

The identification rules 235 may include rules that specify how to compare the previous locations and times with the current location. An identification rule may specify to verify that the user is at the location indicated in the request if the identification engine 275 previously confirmed the identity of the user within ten miles of the current location and less than one hour ago. For example, if the identification engine 275 previously confirmed the identity of the user thirty minutes ago and eight miles from the current location, then the identification engine 275 will verify that the user is at the current location. The identification engine 275 may also make this determination based on the computing device being located at the current location.

The identification rules 235 may include other rules that specify how to compare the previous locations and times received from the identification log 250 and the current location. For example, an identification rule may specify to verify that the user is at the current location if the current location is along a path indicated by the previous locations from the identification log 250. As another example, a rule may specify to verify that the user is at the current location if the current location is within a threshold distance of the most immediate previous location and the timestamp of the most immediate previous location is within a threshold period of time of the current time. In some implementations, the threshold period of time and the threshold distance may be related by a ratio, such that the threshold period of time may be longer if the threshold distance is shorter and the threshold period of time may be shorter if the threshold distance is longer.

The identification models 240 may be configured to receive data identifying the current location and the previous locations and times received from the identification log 250. The identification models 240 may be configured to output data indicating whether the user is likely at the current location. In some implementations, the identification models 240 may output a confidence score that indicates a likelihood that the user is at the current location. For example, a confidence score of 0.3 may indicate a thirty percent likelihood that the user is at the current location. A confidence score of 0.8 may indicate an eighty percent likelihood that the user is at the current location. The identification models 240 may include various models that are each configured to receive a different number of previous locations and times. For example, an identification model may be configured to receive the current location and one previous location and time pair. Another identification model may be configured to receive the current location and four previous location and time pairs. The identification engine 275 may be configured to select the identification model based on the number of location and time pairs received from the identification log 250.

The one or more processors 210 may implement a model trainer 280 that is configured to train the identification models 240 using machine learning and the historical data 265. The historical data 265 may include data that indicates, for various users, previous locations and times that each of the users were at the previous locations. The model trainer 280 may train each model using training data that includes previous locations and times and that is included in the historical data 265. The model trainer 280 may group the historical data into training data sets. A training data set may include data samples that each include the same number of consecutively collected locations and times. The model trainer 280 may designate the latest time and corresponding location as the current location such that each data sample has the same number of consecutively collected locations and times and a location designated as the current location. The current location may be the location of the data sample where the user was most recently located. The model trainer 280 may train an identification model to receive the same number of consecutively collected locations and times and a current location and output data indicating whether the user is likely at the current location. The model trainer 280 may train different models that are each configured to receive a different number of consecutively collected locations and times based on the size of the data samples used to train the models.

In some implementations, the identification engine 275 may use a combination of the identification models 240 and the identification rules 235 to determine whether the user is likely at the current location. The identification engine 275 may identify an identification model from the identification models 240 based on the number of previous location and time pairs received from the identification log 250. The identification engine 275 may provide the current location and the previous location and time pairs to the selected identification model. The selected identification model may output a confidence score that indicates a likelihood that the user is at the current location. If the confidence score is less than a lower threshold, then the identification engine 275 may determine that the user is likely not at the current location. If the confidence score is greater than an upper threshold, then the identification engine 275 may determine that the user is likely at the current location. If the confidence score is between the lower and upper thresholds, then identification engine 275 may apply the identification rules 235 to the current location and the previous location and time pairs to determine whether user is likely at the current location.

In some implementations, the identification engine 275 requests permission from the user whether to transmit verification data indicating that the user is at the current location. The identification engine 275 may determine that the user is likely at the current location. The identification engine 275 may transmit a share request to the computing device of the user. If the user authorizes the server 200 to verify the location of the user, then the identification engine 275 may output data indicating that the user is at the current location. If the user does not authorize the server 200 to verify the location of the user, then the identification engine 275 may output data indicating that the server 200 is unable to determine the location of the user.

Figure 4:
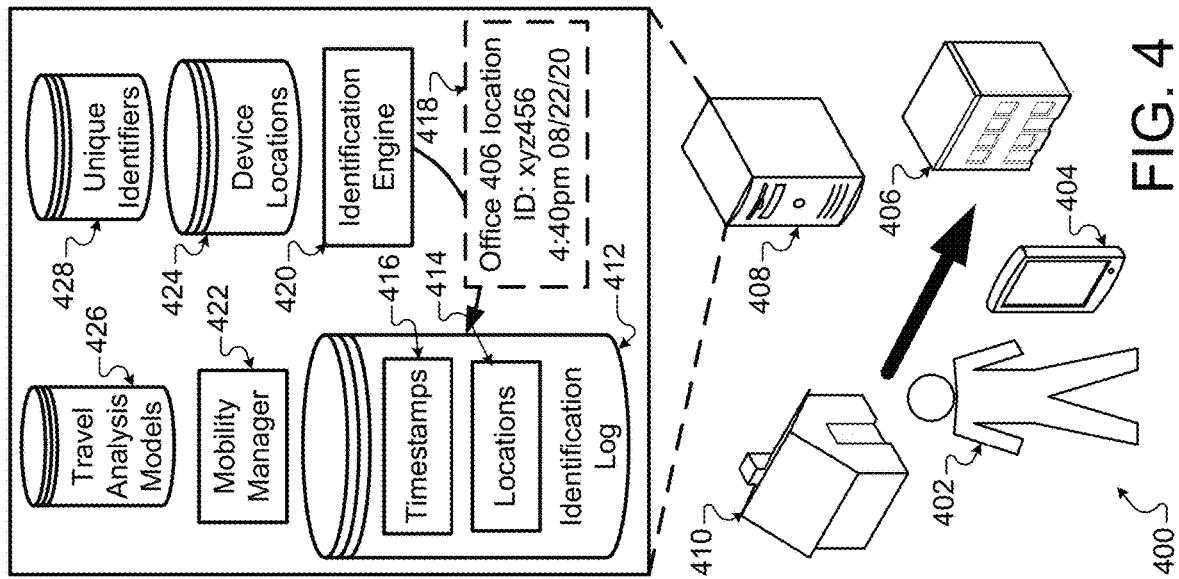
Figure 3:
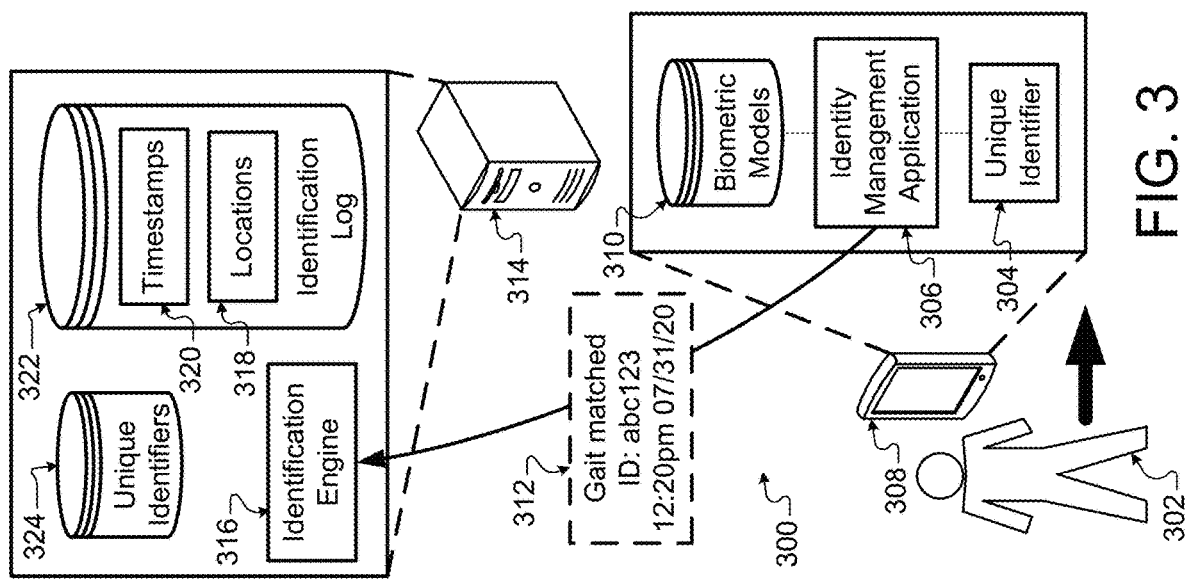

FIGS. 3-5 illustrate example scenarios 300, 400, and 500 of an example system confirming a user's identity. Each of the scenarios 300, 400, and 500 illustrates a server or a computing device of a user using biometric identification to determine that the user is near or interacting with the computing device. In scenario 300, the computing device 308 uses gait identification to determine that the user 302 is moving and carrying the computing device 308. In scenario 400, the server 408 uses travel data to determine that the user 402 is moving with the computing device 404. In scenario 500, the computing device 506 uses typing data to determine that the user 502 is typing on the computing device 506. In each of the scenarios 300, 400, and 500, the server 314, 408, and 516 stores data indicating the identity of the user, the location of the respective computing device, and the time of the identification.

Each of the scenarios 300, 400, and 500 involves associating a user with a self-sovereign identity. A self-sovereign identity may be a unique identifier of an individual of which the individual has control. The self-sovereign identity may be included in a government identification document and may be associated with a computing device that the user controls, such as a mobile phone. In some instances, a government entity may assign a user a unique identifier as a self-sovereign identity. The user may then associate that unique identifier with other identifications such as a passport or other identification document. The user may also allow a wireless carrier the ability to associate the unique identifier with a mobile phone. The wireless carrier may then be able to determine the activity of the unique identifier and, in turn, the user, by monitoring the mobile phone.

In some implementations, a user may not have a unique identifier assigned as a self-sovereign identity but may wish to benefit from the wireless carrier monitoring and being able to confirm the location of the user to a third party. This confirmation ability may free the user of the need to provide identification documents to a third party to prove the identity of the user. If the user does not have a unique identifier assigned as a self-sovereign identity, then the wireless carrier may assign one when the user purchases the mobile device. The wireless carrier may inspect an identification document of the user and assign a unique identifier as a self-sovereign identity. The unique identifier may be stored on the phone and may be stored on a server of the wireless carrier network. The server may associate the unique identifier with the mobile device. As part of the initialization, the user may provide data to train one or more biometric models that may be running on the mobile phone or the server. For example, the user may walk around holding the mobile phone or with the mobile phone in the pocket of the user in order to provide data to train a gait identification model. The user may type various sample sentences on the mobile device in order to provide data to train a typing identification model. The user may also carry the phone wherever the user travels for a period of time, such as three or four days, to train a travel identification model.

In scenario 300 of FIG. 3, the computing device 308 uses gait identification to determine when the user 302 is walking with the computing device 308. The computing device 308 provides identification data 312 to the server 314. The server 314 stores a record of the identity confirmation in the identification log 322.

In more detail, the user 302 may be walking, jogging, and/or running and holding the computing device 308. In some cases, the computing device 308 may be in a bag of the user 302 or in a pocket of the user 302. The identity management application 306 may receive sensor data from various sensors on the computing device 308. The sensors may include an accelerometer, a gravity sensor, a proximity sensor, a brightness detector, a camera, and/or any other sensor that may be included in the computing device 308. The identity management application 306 may access the biometric models 310 and select a model based on the received sensor data. For example, if the identity management application 306 receives accelerometer data and gravity sensor data, then the identity management application 306 may select a model that is configured to receive accelerometer data and gravity sensor data. If the identity management application 306 receives accelerometer data, gravity sensor data, and proximity sensor data, then the identity management application 306 may select a model that is configured to receive accelerometer data, gravity sensor data, and proximity sensor data.

The identity management application 306 may provide the sensor data as an input to the selected biometric model. The selected biometric model may be configured to output data indicating whether the movement likely corresponds to the gait of the user 302. If the selected biometric model outputs data indicating that the movement does not likely correspond to the gait of the user 302, then the identity management application 306 may take no action. If the selected biometric model outputs data indicating that the movement does correspond to the gait of the user 302, then the identity management application 306 may provide the identification data 312 to the server 314.

The identification information 312 may include the unique identifier 304, e.g., a self-sovereign identity, of the user 302. In some implementations, the identification information 312 may also include data identifying the type of determination that the identity management application 306 used to identify the user 302. For example, the identification information 312 may indicate that the identity management application 306 determined that the motion of the computing device 308 corresponds to the gait of the user 302. In some implementations, the identification information 312 may also include a timestamp that indicates the date and time that the identity management application 306 received the sensor data or determines that the sensor data corresponded to the gait of the user 302.

In some implementations, the identity management application 306 may continuously or periodically provide sensor data to a model of the biometric models 310. For example, the identity management application 306 may provide sensor data every fifteen seconds, two minutes, five minutes, or any other period of time. In some implementations, the identity management application 306 may provide sensor data to a model of the biometric models 310 in response to detecting a change in the sensor data. In some implementations, the change may be a threshold change. For example, if the sensor data changes at least five percent, then the identity management application 306 may provide the new sensor data to a model of the biometric models 310.

The identification engine 316 of the server 314 receives the identification information 312. The identification engine 316 updates the identification log 322 to indicate the time and location when and where the computing device 308 confirmed that the user 302 was near or interacting with the computing device 308. The identification engine 316 accesses a mobility manager, similar to mobility manager 144 of FIG. 1, to determine the location of the computing device 308. The identification engine 316 may access the unique identifiers 324 to determine the identifier for the computing device 308 that corresponds to the unique identifier of the self-sovereign identity. The identification engine 316 may provide the identifier of the computing device 308 to the mobility manager with the request for the location of the computing device 308. The mobility manager may provide the identification engine 316 the location of the computing device 308. For example, the mobility manager may indicate that the computing device 308 is at 47.605921, −122.335823.

The identification engine 316 updates the locations 318 to include the location of the computing device 308 as identified by the mobility manager. The identification engine 316 may also include the unique identifier of the user 302 that was included in the identification information 312. For example, the identification engine 316 may update the locations 318 to include the unique identifier abc123 and the location 47.605921, −122.335823. The identification engine 316 may also include the timestamp that was included in the identification information 312 in the timestamps 320. In some implementations, the identification information 312 may include a timestamp. In this case, the identification engine 316 may include the time that the identification engine 316 received the identification information 312 in the timestamps 320.

In scenario 400 of FIG. 4, the server 408 uses travel analysis to determine when the user 402 is with the computing device 404. The server 408 accesses the location data of the computing device 404 and provides the location data to a travel analysis model. If the travel analysis model indicates that the travel of the computing device 404 matches the expected travel of the user 402, then the server 408 stores a record of the identity confirmation in the identification log 412.

In more detail, the user 405 may be traveling from the house 410 to the office 406. The user 405 may have the computing device 404 when traveling from the house 410 to the office 406. The user 405 may move at different speeds when traveling from the house 410 to the office 406 depending on whether the user 405 is walking, biking, driving, or taking public transportation.

The identification engine 420 may request the location of the computing device 404 from the mobility manager 422 at periodic intervals, such as every ten second, thirty second, two minutes, or any other similar time period. The mobility manager 422 may monitor the location of the computing device 404 and store data indicating the location of the computing device 404 in the device locations 424. The identification engine 420 may associate each of the locations received from the mobility manager 422 with a timestamp based on the time that the mobility manager 422 provided the location data.

The identification engine 420 may access the unique identifiers 428 to determine the unique identifier of the self-sovereign identity of the user 402 of the computing device 404. Based on the unique identifier of the self-sovereign identity of the user 402 and the location data received from the mobility manager 422, the identification engine 420 may select a travel analysis model from the travel analysis models 426. The identification engine 420 may select a travel analysis model based on the number of locations received from the mobility manager 422. For example, if the identification engine 420 received five locations, then the selected travel analysis model may be configured to receive the five locations. The selected travel analysis model may be configured to output data indicating whether the user 402 was likely traveling with the computing device 404.

In some implementations, the travel analysis models 426 may include various models that are each trained using travel data from different users. In this case, the travel analysis models 426 may include a model to determine whether the location data corresponds to movement of the user 402 and other models to determine whether the location data corresponds to movement of other users. The identification engine 420 may select a travel analysis model that is configured to determine whether the location data corresponds to movement of the user 402.

The identification engine 420 provides the location data to the selected travel analysis model. The selected travel analysis model may output data indicating whether the location data reflects the movement of the user 402. If the selected travel analysis model outputs data indicating that the location data reflect the movement of the user 402, then the identification engine 420 may store identification data 418 in the identification log 412. If the selected travel analysis model outputs data indicating that the location data does not reflect the movement of the user 402, then the identification engine 420 may perform no additional actions.

The identification data 418 may include a unique identifier of the self-sovereign identity of the user 402, a location where the computing device 404 was located at the end of the traveling, and a time that the computing device 404 was located at that location. The identification engine 420 may store the location where the computing device 404 was located at the end of the traveling in the locations 414 along with the unique identifier of the self-sovereign identity of the user 402. The identification engine 420 may store the time that the computing device 404 was located at the ending location in the locations 414.

In scenario 500 of FIG. 5, the computing device 506 uses typing identification to determine whether the user 502 is typing on the computing device 506. If the computing device 506 determines that the user 502 is typing on the computing device 506, then computing device 506 provides identification information 514 to the server 516. The server 516 stores a record of the identity confirmation in the identification log 524.

In more detail, the user 502 may be typing a text message, email, or other similar text in the computing device 506. The identity management application 508 may monitor typing data that includes the location of a finger as a key registers, the time that a finger remains on the screen while pressing a key, the time period between key presses, the size of a finger on the screen, the key that registers, and/or any other similar typing information. The identity management application 508 may access the biometric models 512 and select a model based on the collected typing data. For example, if the identity management application 508 detects the location of a finger as a key registers and the time period between key presses, then the identity management application 508 may select a model that is configured to receive the location of a finger as a key registers and the time period between key presses. If the identity management application 508 detects the time period between key presses, the size of a finger on the screen, and the key that registers, then the identity management application 508 may select a model that is configured to receive the time period between key presses, the size of a finger on the screen, and the key that registers.

The identity management application 508 may provide the typing data as an input to the selected biometric model. The selected biometric model may be configured to output data indicating whether the typing likely corresponds to the typing of the user 502. If the selected biometric model outputs data indicating that the typing does not likely correspond to the typing of the user 502, then the identity management application 508 may take no action. If the selected biometric model outputs data indicating that the typing does correspond to the typing of the user 502, then the identity management application 508 may provide the identification information 514 to the server 516.

The identification information 514 may include the unique identifier 504 of the user 502. In some implementations, the identification information 514 may also include data identifying the type of determination that the identity management application 508 used to identify the user 502. For example, the identification information 514 may indicate that the identity management application 508 determined that the typing corresponds to the typing of the user 502. In some implementations, the identification information 514 may also include a timestamp that indicates the date and time that the identity management application 508 detected the typing or determined that the typing is that of the user 502.

In some implementations, the identity management application 508 may continuously or periodically provide typing data to a model of the biometric models 512. For example, the identity management application 508 may provide typing data every three seconds, five seconds, or any other period of time after typing begins. In some implementations, the identity management application 508 may provide typing data to a model of the biometric models 512 in response to detecting a pause in typing that is greater than a threshold time period. For example, if the identity management application 508 detects a five second pause in typing, then the identity management application 508 may provide the recent typing data to a model of the biometric models 512.

The identification engine 518 of the server 516 receives the identification information 514. The identification engine 518 updates the identification log 524 to indicate the time and location when and where the computing device 506 confirmed that the user 502 was interacting with the computing device 506. The identification engine 518 accesses a mobility manager to determine the location of the computing device 506. The identification engine 518 may access the unique identifiers 526 to determine the identifier for the computing device 506 that corresponds to the unique identifier of the self-sovereign identity. The identification engine 518 may provide the identifier of the computing device 506 to the mobility manager with the request for the location of the computing device 506. The mobility manager may provide the identification engine 518 the location of the computing device 506. For example, the mobility manager may indicate that the computing device 506 is at 47.605921, −122.335823.

The identification engine 518 updates the locations 520 to include the location of the computing device 506 as identified by the mobility manager. The identification engine 518 may also include the unique identifier of the user 502 that was included in the identification information 514. For example, the identification engine 518 may update the locations 520 to include the unique identifier rst789 and the location 47.605921, −122.335823. The identification engine 518 may also include the timestamp that was included in the identification information 514 in the timestamps 522. In some implementations, the identification information 514 may include a timestamp. In this case, the identification engine 518 may include the time that the identification engine 518 received the identification information 514 in the timestamps 522.

Figure 8:
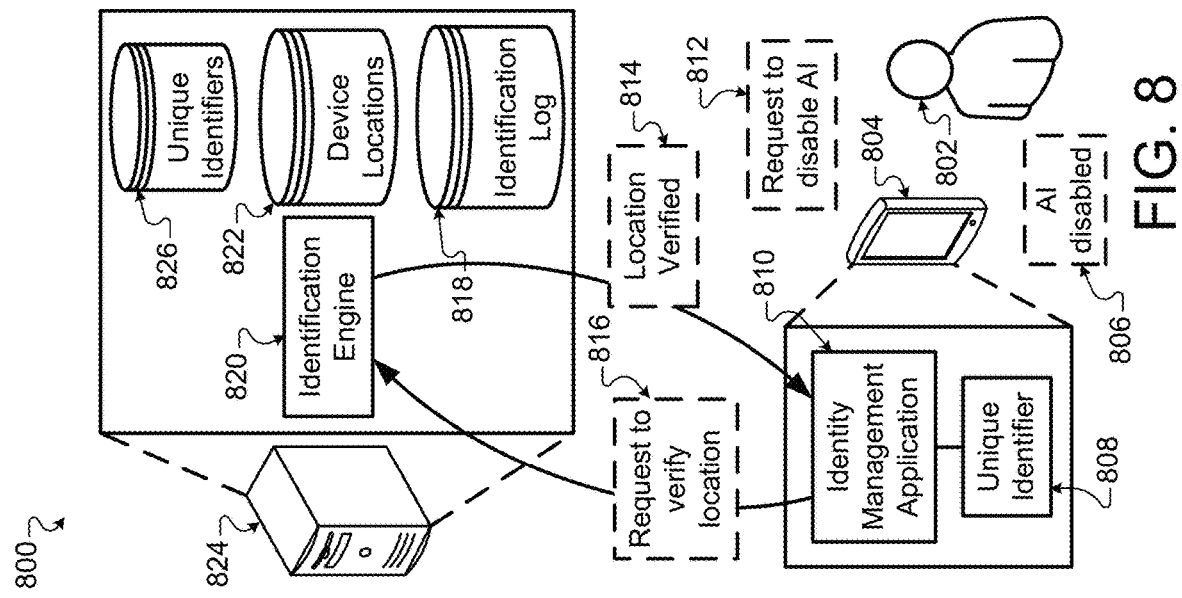
Figure 7:
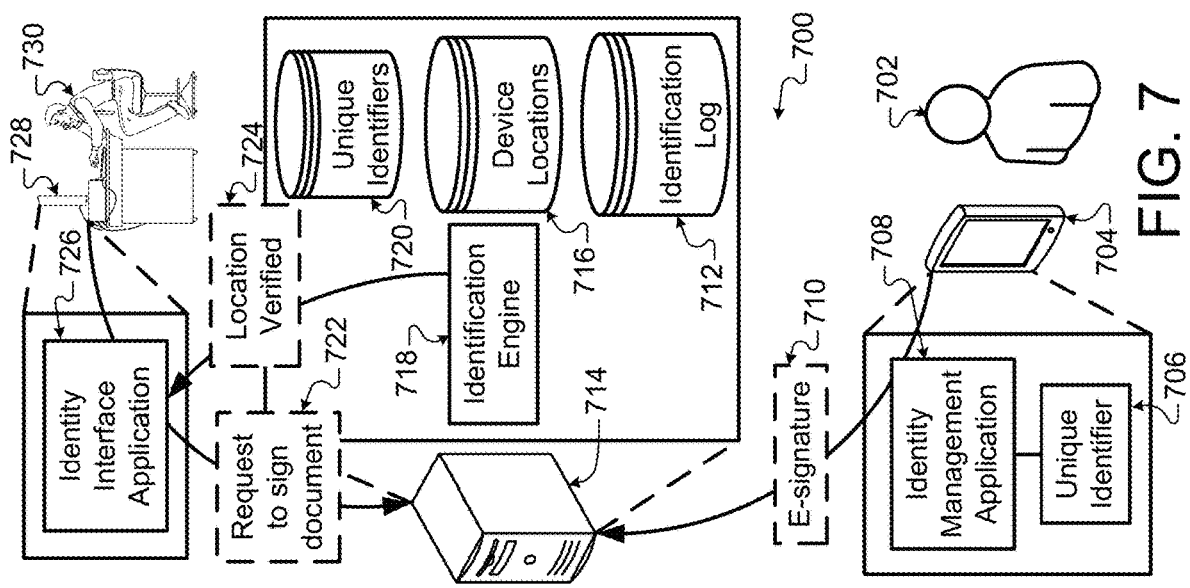

FIGS. 6-8 illustrate example scenarios 600, 700, and 800 of a user managing the user's identity. Each of the scenarios 600, 700, and 800 illustrates a server accessing the previous locations and times where and when the server confirmed the identity of the user. These previous locations and times may be similar to the locations and times identified in scenarios 300, 400, and 500. The server analyzes the previous times and locations and a current location where the user may be. Based on the previous times and locations and the current location, the server determines whether the user is likely at the current location. This data may be provided to various third parties who wish to verify that the user is at a particular location of that the user has authorized sharing of personal data.

Each of the scenarios 600, 700, and 800 illustrates a server or a computing device of a user using biometric identification to determine that the user is near or interacting with the computing device. In scenario 300, the computing device 308 uses gait identification to determine that the user 302 is moving and carrying the computing device 308. In scenario 400, the server 408 uses travel data to determine that the user 402 is moving with the computing device 404. In scenario 500, the computing device 506 uses typing data to determine that the user 502 is typing on the computing device 506. In each of the scenarios 300, 400, and 500, the server 314, 408, and 516 stores data indicating the identity of the user, the location of the respective computing device, and the time of the identification.

Each of the scenarios 600, 700, and 800 involves using a self-sovereign identity to confirm that the user is person providing the data to the third party. The user may be assigned a self-sovereign identity in a similar manner as described above. For example, a wireless carrier or a government entity may assign a self-sovereign identity to a user. The unique identifier of the self-sovereign identity may be stored on a server of the wireless carrier and on the computing device of the user. The user may transfer the self-sovereign identity to another device if the user purchases a new one or subscribes to a different wireless carrier.

In scenario 600 of FIG. 6, the user 602 may be attempting to share heartbeat pulse data 612 collected from the watch 608 of the user 602 with a healthcare provider 634. Because of the sensitivity of transmitting and analyzing healthcare data, the healthcare provider 634 wishes to have an extra level of certainty that the heartbeat pulse data 612 is from the user 602 and that the user 602 authorized the sharing of the heartbeat pulse data 612. The server 620 may use the previous locations and times where the server 620 confirmed the identity of the user and the current location of the computing device 604 to determine whether the heartbeat pulse data 612 is that of the user 602 and whether the user 602 authorized sharing of the heartbeat pulse data 612.

In more detail, the user 602 uses the watch 608 to measure the pulse of the user 602. The user 602 may view the pulse data on the watch 608 and/or the watch 608 may provide the heartbeat pulse data to the computing device 604 for viewing on the computing device. The user 602 may receive a request from the healthcare provider 634 for user 602 to share the pulse data of the user 602. The user may use the computing device 604 to authorize sharing of the pulse data.

The computing device 604 may include an identity management application 606 and may store the unique identifier 610 of the self-sovereign identity of the user 602. The computing device 604 may receive the request from the user 602 to share the heartbeat pulse data. Before sharing the heartbeat pulse data 612 or before instructing the watch 608 to share the heartbeat pulse data 612, the identity management application 606 on the computing device 604 may determine whether the user 602 likely provided the pulse data sharing instruction to the computing device 604.

To determine whether the user 602 likely provided the pulse data sharing instruction to the computing device 604, the identity management application 606 may provide a share notification 614 to the identification engine 622 of the server 620. The share notification 614 may include the unique identifier 610 and data indicating that the user 602 is attempting to share the heartbeat pulse data 612. The identification engine 622 may determine the identifier of the computing device 604 that corresponds to the unique identifier 610 by accessing the unique identifiers 624. The identification engine 622 may provide the identifier of the computing device 604 to the device locations 618 to determine the current location of the computing device 604. The identification engine 622 accesses the identification log 616 for the previous location and times where and when the identification engine 622 confirmed the user 602 was near and/or interacting with the computing device 604. The identification engine 622 may use the unique identifier 610 to access the previous locations and times that correspond to the user 602.

The identification engine 622 may use various identification rules and/or identification models to analyze the previous locations and times and the current location of the computing device 604. The identification rules and/or identification models may output data indicating whether the user 602 is near the computing device 604. If the identification rules and/or identification models output data indicating that the user 602 is not near the computing device 604, then the identification engine 622 may deny the share request 614 and not share the heartbeat pulse data 612 with the healthcare provider 634. If the identification rules and/or identification models output data indicating that the user 602 is near the computing device, then the identification engine 622 may proceed with the instructions in the share request 614.

To proceed with the instructions in the share request 614, the identification engine 622 may provide verification data to the identity management application 606 of the computing device 604 and/or the identity interface application 628 of the computing device 632. The identification engine 622 may provide verification data to the identity management application 606 that indicates that the user 602 has likely authorized the sharing of the heartbeat pulse data 612. The identification engine 622 may also provide instructions to the identity management application 606 to share the heartbeat pulse data 612. The identification engine 622 may provide the sharing instructions to the watch 608 if the watch 608 is able to transmit the heartbeat pulse data 612 to the server 620. The identification engine 622 may access a storage device of the computing device 604 that stores the heartbeat pulse data 612. The watch 608 and/or the identification engine 622 may provide the pulse data to the server 620. The server 620 may provide the heartbeat pulse data 612 to the computing device 632.

The identification engine 622 may provide verification data 630 to the identity interface application 628 on the computing device 632. The verification data 630 may indicated that the heartbeat pulse data 612 is that of the user 602 and that the user 602 authorized the sharing of the heartbeat pulse data 612. The identity interface application 628 may generate a graphical interface or icon to present on the screen of the computing device 632 to indicate that the heartbeat pulse data 612 is that of the user 602 and that the user 602 authorized the sharing of the heartbeat pulse data 612. In some implementations, the identity interface application 628 may append data to the heartbeat pulse data 612 to indicate that the heartbeat pulse data 612 is that of the user 602 and/or that the user 602 authorized the sharing of the heartbeat pulse data 612.

In scenario 700 of FIG. 7, the user 702 may request that the notary 730 notarize an electronic document that the user 702 is going to sign electronically. Because the notary 730 is not physically present, the notary 730 is not able to examine a physical identification card of the user 702. Instead, the server 714 is going to use the identification engine 718 to verify that the user 702 is near the computing device 704 while the computing device 704 is receiving an electronic signature. The server 714 may provide verification data 724 to the notary 730 that indicates that the user 702 is the one providing the electronic signature.

In more detail, the user 702 may transmit the electronic document to the notary 730. The notary 730 may view the electronic document on the computing device 728 and share the electronic document with the user 702. The user may view the shared document on the computing device 704. Before the user 702 electronically signs the electronic document the notary 730 may have to verify that the user 702 is who the user 702 claims to be and is the one who is near the computing device 704 to sign the electronic document.

The computing device 728 may include an identity interface application 726. The notary 730 may request identifying information from the user 702 such as the name of the user 702. The notary 730 may provide the identifying information of the user 702 to the identity interface application 726. For example, the notary 730 may provide the name of the user 702 to the identity interface application 726. The identity interface application 726 may provide the identifying information to the identification engine 718 and a request to verify that the user 702 is near the computing device 704.

The identification engine 718 receives the identifying information and accesses the unique identifiers 720 that includes the self-sovereign identities and identifiers for the computing device for each of the self-sovereign identities. The identification engine 718 determines the unique identifier for the user 702 based on the identifying information and determines an identifier for the computing device 704 of the user 702. The identification engine 718 determines the current location of the computing device 704 by accessing the device locations 716 using the identifier of the computing device 704.

The identification engine 718 determines the previous times and locations when and where the user 702 was interacting with or near the computing device 704 by accessing the identification log 712. The identification engine 718 accesses the identification log 712 for the previous location and times where and when the identification engine 718 confirmed the user 702 was near and/or interacting with the computing device 704. The identification engine 718 may use the unique identifier of the user 702 to access the previous locations and times that correspond to the user 702.

The identification engine 718 may use various identification rules and/or identification models to analyze the previous locations and times and the current location of the computing device 704. The identification rules and/or identification models may output data indicating whether the user 702 is near the computing device 704. If the identification rules and/or identification models output data indicating that the user 702 is not near the computing device 704, then the identification engine 718 may provide data to the identity interface application 726 that the server 714 is unable to determine the location and/or identity of the user 702. The notary 730 may then be unable to complete the notarizing of the electronic document. If the identification rules and/or identification models output data indicating that the user 702 is near the computing device 704, then the identification engine 718 provide verification data 724 to the identity interface application 726.

The identity interface application 726 receives the verification data 724 that indicates that the user 702 is near the computing device 704. The identity interface application 726 generates a graphical interface that indicates that the user 702 is near the computing device 704. The notary 730 may view this graphical interface and proceed with the notarizing process. The notary 730 may have the confidence that the user 702 is the person who will be electronically signing the electronic document.

To proceed with the notarizing process, the notary 730 may request that the user 702 sign the electronic document. The computing device 728 may transmit a signing request 722 to the server 714. The server 714 may provide the signing request 722 to the computing device 704. The computing device 704 may receive the signing request 722 and output a graphical interface indicating that the user 702 should sign the electronic document. The user 702 signs the electronic document, and the computing device 704 transmits the electronic signature 710 to the server 714. The server 714 transmits the electronic signature 710 to the computing device 728. The notary 730 views the electronic signature 710 on the computing device 728 and electronically notarizes the electronic document.

In scenario 800 of FIG. 8, the user 802 may be attempting to disable the artificial intelligence functions on the computing device 804. The computing device 804 may be configured to confirm that the user 802 is the one who is interacting with the computing device 804. The computing device 804 may ensure that the user 802 is the one who is interacting with the computing device 804 because the artificial intelligence functions may be able to prevent certain attacks against the computing device 804. For example, the artificial intelligence functions may be able to prevent a nefarious actor from spoofing the facial recognition capability by wearing special eyeglasses. Because disabling the artificial intelligence functions on the computing device 804 may make the computing device 804 more susceptible to hacking, the computing device 804 may attempt to ensure that the user 802 is the one who is providing that instruction.

In more detail, the user 802 may enter a disable request 812 to the computing device 804 to disable the artificial intelligence functions. The identity management 810 may detect the disable request 812 and attempt to verify that the user 802 is interacting with the computing device 804. The identity management application 810 may transmit a verification request 816 to the identification engine 820 of the server 824. The verification request 816 may include the unique identifier 808 of the self-sovereign identity of the user 802.

The identification engine 820 receives the verification request 816 that includes the unique identifier 808 of the self-sovereign identity of the user 802. The identification engine 820 may access the unique identifiers 826 that includes the unique identifiers for the self-sovereign identities and identifiers for the computing device for each of the self-sovereign identities. The identification engine 820 determines the identifier for the computing device 804 that corresponds to the unique identifier 808. The identification engine 820 determines the current location of the computing device 804 by accessing the device locations 822 using the identifier of the computing device 804.

The identification engine 820 determines the previous times and locations when and where the user 802 was interacting with or near the computing device 804 by accessing the identification log 818. The identification engine 820 accesses the identification log 818 for the previous location and times where and when the identification engine 820 confirmed the user 802 was near and/or interacting with the computing device 804. The identification engine 820 may use the unique identifier of the user 802 to access the previous locations and times that correspond to the user 802.

The identification engine 820 may use various identification rules and/or identification models to analyze the previous locations and times and the current location of the computing device 804. The identification rules and/or identification models may output data indicating whether the user 802 is near the computing device 804. If the identification rules and/or identification models output data indicating that the user 802 is not near the computing device 804, then the identification engine 820 may provide data to the identity management application 810 that the server 824 is unable to determine the location and/or identity of the user 802. The computing device 804 may not disable the artificial intelligence functions. If the identification rules and/or identification models output data indicating that the user 802 is near the computing device 804, then the identification engine 820 may provide verification data 814 to the identity management application 810.

The identity management application 810 receives the verification data 814 that indicates that the user 802 is near the computing device 804. The identity management application 810 may generate a graphical interface that indicates that the disable request 812 is authorized. The computing device 804 may then disable the artificial intelligence functions. In some implementations, the computing device 804 may output a graphical interface 806 indicating that the artificial intelligence functions are disabled.

Figure 9:
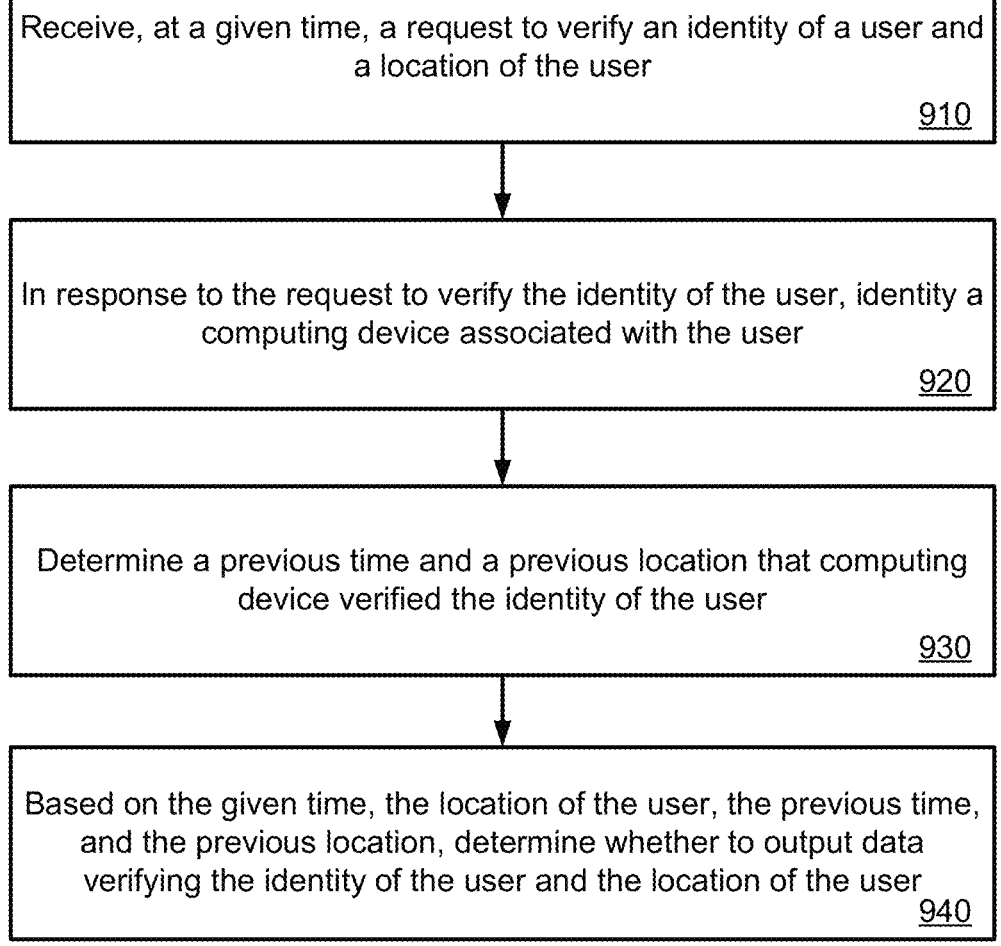
FIG. 9 is a flowchart of an example process for managing a user's identity.

FIG. 9 is a flowchart of an example process 900 for managing a user's identity. In general, the process 900 receives a request to determine whether a user is near and/or interacting with a computing device. The process 900 uses the current location of the computing device, the previous times and locations when and where the identity of the user was confirmed, and various rules and/or models to determine whether the user is near and/or interacting with the computing device. The process 900 will be described as being performed by the server 114 of FIG. 1 and will include references to other components in FIG. 1. The process 900 may also be performed by the server 200 of FIG. 2, the server 314 of FIG. 3, the server 408 of FIG. 4, the server 516 of FIG. 5, the server 620 of FIG. 6, the server 714 of FIG. 7, and/or the server 824 of FIG. 8.

The server 114 receives, at a given time, a request to verify an identity of a user and a location of the user (910). In some implementations, the request may include data identifying a user 102, such as a name of the user 102, birthdate, and/or address of the user 102. In some implementations, the request may be a request to verify that the user 102 is located at a location specified in the request. For example, the request may be to verify that the user 102 is located at the location of a computing device 104 or at a location of a computing device 118 transmitting the request.

In response to the request to verify the identity of the user, the server 114 identifies a computing device 104 associated with the user (920). The server 114 may determine a unique identifier of a self-sovereign identity of the user. The server 114 may determine the unique identifier using the identifying information of the user 102 included in the request. The server 114 may also determine an identifier of the computing device 104 that is associated with the unique identifier using the identifying information of the user 102.

The server 114 determines a previous time and a previous location that computing device verified the identity of the user (930). The server 114 may access an identification log 150 that includes the previous times and locations when and where the server 114 confirmed the identity of the user 102. In some implementations, the server 114 and/or the computing device 104 may confirm the identity of the user 102 using biometric identification. For example, the computing device 104 may analyze sensor data collected from various sensors on the computing device 104. The computing device 104 may confirm that the user 102 is interacting and/or in the vicinity of the computing device 104 by analyzing the sensor data using biometric identification.

In some implementations, the server 114 may access a mobility manager 144 to determine a current location of the computing device 104. The mobility manager 144 may store data indicating the locations of the computing device 104 and other computing devices connected to the server 114. In some implementations, the server 114 may determine the distance between the current location of the computing device 104 and the previous location. In some implementations, the server 114 may determine an amount of time between the given time and the previous time.

Based on the given time, the location of the user, the previous time, and the previous location, the server 114 determines whether to output data verifying the identity of the user and/or the location of the user (940). In some implementations, the server 114 may determine whether to output data verifying the identity of the user and the location of the user based on the distance between the current location of the computing device 104 and the previous location. In some implementations, the server 114 may determine whether to output data verifying the identity of the user and the location of the user based on the amount of time between the given time and the previous time. The server 114 may compare the amount of time between the given time and the previous time to a threshold period of time to determine whether to output data verifying the identity of the user and the location of the user.

In some implementations, the user 102 may authorize the server 114 to output data verifying the identity of the user and/or the location of the user. In some implementations, the server 114 may provide the data identifying the current location of the computing device, data identifying the given time, data identifying the previous time, and data identifying the previous location to a model that is configured to determine whether the user is likely at the current location. Based on the output of the model the server may determine whether to output data verifying the identity of the user and/or the location of the user 102. The server 114 may train the model using historical data and machine learning. This historical data may include locations where the user 102 has been and times that the user 102 was at those locations.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   receiving, by a first computing device and from a third computing device, sensor data that reflects characteristics of the third computing device;
   determining, by the first computing device, a user associated with the third computing device;
   storing, by the first computing device, the sensor data in association with data identifying the user;
   receiving, at a second time, by the first computing device, and from a second computing device, a request to verify that the user is at a second location;
   in response to the request to verify that the user is at the second location:
   providing, for output by the first computing device and to the third computing device, a request for data indicating a time when the third computing device verified a location of the user and data indicating the location;
   in response to the request for the data indicating the time when the third computing device verified the location of the user and the data indicating the location, receiving, by the first computing device and from the third computing device, data indicating that the third computing device determined that the third computing device was, at a first time, in a first location that was in a vicinity of the user by comparing additional sensor data generated by the third computing device to the sensor data, wherein the third computing device is configured to periodically determine, independent of a request from the first, second, or other computing devices, whether the third computing device is in the vicinity of the user by generating given sensor data and comparing the given sensor data to the sensor data;

determining, by the first computing device, a time difference between (i) the first time that the third computing device determined that the third computing device was at the first location and that that the user was in the vicinity of the third computing device and (ii) the second time; and determining, by the first computing device, a location difference between the first location and the second location;

determining, by the first computing device, a threshold period of time;

based on the threshold period of time, determining, by the first computing device, a threshold distance that is inversely proportional to the threshold period of time;

comparing, by the first computing device, the time difference to the threshold period of time;

comparing, by the first computing device the location difference to the threshold distance; and based on comparing the time difference to the threshold period of time and comparing the location difference to the threshold distance, determining, by the first computing device, whether to output, to the second computing device, data verifying that the user is at the second location.

2. The method of claim 1, comprising:
determining a current location of the third computing device,
wherein determining whether to output the data verifying that the user is at the second location is based on the current location of the third computing device.

3. The method of claim 2, comprising:
determining a distance between the current location of the third computing device and the second location,
wherein determining whether to output the data verifying that the user is at the second location is based on the distance between the current location of the third computing device and the second location.

4. The method of claim 1, comprising:
receiving, from the third computing device, data indicating to verify the identity of the user,
wherein determining whether to output the data verifying that the user is at the second location is based on receiving, from the third computing device, the data indicating to verify the identity of the user.

5. The method of claim 1, comprising:
determining a current location of the third computing device; and
providing data identifying the current location of the third computing device, data identifying the second time, data identifying the first time, and data identifying the first location to a model that is configured to determine whether the user is likely at the current location,
wherein determining whether to output the data verifying that the user is at the second location is based on data output by the model.

6. The method of claim 5, comprising:
accessing historical data that includes locations and times that the user was at the locations; and
training, using machine learning, the model using the historical data.

7. The method of claim 1, wherein the third computing device verified that the user is at the first location and at the first time using biometric identification.

8. The method of claim 1, wherein:
receiving the request to verify that the user is at the second location comprises receiving the request to verify that the user is at an additional location of an additional computing device receiving a vote from the user, and
determining whether to output the data verifying that the user is at the second location comprises determining whether to verify that the user is at the additional location of the additional computing device.

9. The method of claim 1, wherein:
receiving the request to verify that the user is at the second location comprises receiving the request to verify that the user is at an additional location of an additional computing device and is signing an electronic document on the additional computing device, and
determining whether to output the data verifying that the user is at the second location comprises determining whether to verify that the user is at the additional location of the additional computing device and is signing the electronic document on the additional computing device.

10. A system, comprising:
one or more processors; and
memory including a plurality of computer-executable components that are executable by the one or more processors to perform a plurality of actions, the plurality of actions comprising:
receiving, by a first computing, device and from a third computing device, sensor data that reflects characteristics of the third computing device;
determining, by the first computing device, a user associated with the third computing device;
storing, by the first computing device, the sensor data in association with data identifying the user;
receiving, at a second time, by the first computing device, and from a second computing device, a request to verify that the user is at a second location;
in response to the request to verify that the user is at the second location:
providing, for output by the first computing device and to the third computing device, a request for data indicating a time when the third computing device verified a location of the user and data indicating the location;
in response to the request for the data indicating the time when the third computing device verified the location of the user and the data indicating the location, receiving, by the first computing device and from the third computing device, data indicating that the third computing device determined that the third computing device was, at a first time, in a first location that was in a vicinity of the user by comparing additional sensor data generated by the third computing device to the sensor data, wherein the third computing device is configured to periodically determine, independent of a request from the first, second, or other computing devices, whether the third computing device is in the vicinity of the user by generating given sensor data and comparing the given sensor data to the sensor data;
determining, by the first computing device, a time difference between (i) the first time that the third computing device determined that the third computing device was at the first location and that that the user was in the vicinity of the third computing device and (ii) the second time; and determining, by the first computing device, a location difference between the first location and the second location;

determining, by the first computing device, a threshold period of time;

based on the threshold period of time, determining, by the first computing device, a threshold distance that is inversely proportional to the threshold period of time;

comparing, by the first computing device, the time difference to the threshold period of time;

comparing, by the first computing device the location difference to the threshold distance; and based on comparing the time difference to the threshold period of time and comparing the location difference to the threshold distance, determining, by the first computing device, whether to output, to the second computing device, data verifying that the user is at the second location.

11. The system of claim 10, wherein the actions comprise: determining a current location of the third computing device, wherein determining whether to output the data verifying that the user is at the second location is based on the current location of the third computing device.

12. The system of claim 10, wherein the actions comprise: receiving, from the third computing device, data indicating to verify the identity of the user, wherein determining whether to output the data verifying that the user is at the second location is based on receiving, from the third computing device, the data indicating to verify the identity of the user.

13. The system of claim 10, wherein the actions comprise: determining a current location of the third computing device; and providing data identifying the current location of the third computing device, data identifying the second time, data identifying the first time, and data identifying the first location to a model that is configured to determine whether the user is likely at the current location, wherein determining whether to output the data verifying that the user is at the second location is based on data output by the model.

14. The system of claim 10, wherein the third computing device verified that the user is at the first location and at the first time using biometric identification.

15. The system of claim 10, wherein:

receiving the request to verify that the user is at the second location comprises receiving the request to verify that the user is at an additional location of an additional computing device receiving a vote from the user, and determining whether to output the data verifying that the user is at the second location comprises determining whether to verify that the user is at the additional location of the additional computing device.

16. One or more non-transitory computer-readable media of a computing device storing computer-executable instructions that upon execution cause one or more processors to perform acts comprising:

receiving, by a first computing device and from a third computing device, sensor data that reflects characteristics of the third computing device;

determining, by the first computing device, a user associated with the third computing device;

storing, by the first computing device, the sensor data in association with data identifying the user;

receiving, at a second time, by the first computing device, and from a second computing device, a request to verify that the user is at a second location;

in response to the request to verify that the user is at the second location:

providing, for output by the first computing device and to the third computing device, a request for data indicating a time when the third computing device verified a location of the user and data indicating the location;

in response to the request for the data indicating the time when the third computing device verified the location of the user and the data indicating the location, receiving, by the first computing device and from the third computing device, data indicating that the third computing device determined that the third computing device was, at a first time, in a first location that was in a vicinity of the user by comparing additional sensor data generated by the third computing device to the sensor data, wherein the third computing device is configured to periodically determine, independent of a request from the first, second, or other computing devices, whether the third computing device is in the vicinity of the user by generating given sensor data and comparing the given sensor data to the sensor data;

determining, by the first computing device, a time difference between (i) the first time that the third computing device determined that the third computing device was at the first location and that that the user was in the vicinity of the third computing device and (ii) the second time; and determining, by the first computing device, a location difference between the first location and the second location;

determining, by the first computing device, a threshold period of time;

based on the threshold period of time, determining, by the first computing device, a threshold distance that is inversely proportional to the threshold period of time;

comparing, by the first computing device, the time difference to the threshold period of time;

comparing, by the first computing device the location difference to the threshold distance; and based on comparing the time difference to the threshold period of time and comparing the location difference to the threshold distance, determining, by the first computing device, whether to output, to the second computing device, data verifying that the user is at the second location.

* * * * *